United States Patent
Cruz (10) Patent No.: US 6,539,484 B1
(45) Date of Patent: *Mar. 25, 2003

(54) CONFIGURABLE POWER DISTRIBUTION CIRCUIT

(75) Inventor: Claude A. Cruz, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,598

(22) Filed: Dec. 18, 1997

(51) Int. Cl.$^7$ .............................. G06F 1/26; G06F 1/28; G06F 1/30
(52) U.S. Cl. ........................ 713/300; 710/107; 307/42
(58) Field of Search ....................... 713/300; 710/107; 714/14; 320/6; 371/22.4; 361/391; 307/454; 370/276

(56) References Cited

U.S. PATENT DOCUMENTS

| | | | | |
|---|---|---|---|---|
| 4,021,838 A | * | 5/1977 | Warwick | 357/68 |
| 4,659,942 A | * | 4/1987 | Volp | 307/19 |
| 4,897,842 A | * | 1/1990 | Hertz et al. | 371/22.4 |
| 5,195,022 A | * | 3/1993 | Hoppal et al. | 361/391 |
| 5,229,661 A | * | 7/1993 | Webb | 307/454 |
| 5,384,769 A | * | 1/1995 | Oprescu et al. | 370/276 |
| 5,446,825 A | * | 8/1995 | Moslehi et al. | 392/416 |
| 5,485,118 A | * | 1/1996 | Chick | 330/54 |
| 5,498,972 A | | 3/1996 | Haulin | |
| 5,534,801 A | * | 7/1996 | We et al. | 327/72 |
| 5,608,646 A | * | 3/1997 | Pomatto | 364/492 |
| 5,654,859 A | * | 8/1997 | Shi | 361/66 |
| 5,656,915 A | * | 8/1997 | Eaves | 320/6 |
| 5,666,355 A | * | 9/1997 | Huah et al. | 370/311 |
| 5,798,951 A | * | 8/1998 | Cho et al. | 364/708.1 |
| 5,954,823 A | * | 9/1999 | Cutts et al. | 714/14 |

OTHER PUBLICATIONS

1394 Trade Association—Power Specification, Part 1: Cable Power Distribution, Feb. 1998.*
1394 Trade Association –Power Specification, Part 1: Cable Power Distribution.*
1394 Trade Association, Power Specification Part 1: Cable Power Distribution, Feb. 13, 1998.
1394 Trade Association, Power Specification Part 2: Suspend/Resume, Apr. 10, 1998.
1394 Trade Association, Power Specification Specification for Power State Management, Jan. 19, 1998.
IEEE Computer Society, Draft Standard for a High Performance Serial Bus (Supplement), Jun. 18, 1997.

* cited by examiner

*Primary Examiner*—Ayaz Sheikh
*Assistant Examiner*—Frantz B. Jean
(74) *Attorney, Agent, or Firm*—Howard A. Skaist (57) ABSTRACT

Briefly, in accordance with one embodiment of the invention, a circuit includes: a physical arrangement of power transistors. The circuit is adapted to couple a node to a power bus segment. The physical arrangement of power transistors is electronically configurable, based on externally derived electrical signals, to sink power to the node from the power bus segment, source power from the node to the power bus segment, and distribute power through the node.

11 Claims, 6 Drawing Sheets

| ROW | A | B | C | D | E | PHY | LINK | BUS SEGMENT 90 POWER SOURCE | BUS SEGMENT 95 POWER SOURCE | BUS SEGMENTS ISOLATED | REDUND. |
|---|---|---|---|---|---|---|---|---|---|---|---|
| 1  | 0 | 0 | 0 | 0 | 0 | I   | I   | 90  | 95  | Y | |
| 2  | 0 | 0 | 0 | 0 | 1 | I   | 95  | 90  | 95  | Y | |
| 3  | 0 | 0 | 0 | 1 | 0 | 90  | I   | 90  | 95  | Y | |
| 4  | 0 | 0 | 0 | 1 | 1 | 90  | 95  | 90  | 95  | Y | |
| 5  | 0 | 0 | 1 | 0 | 0 | I   | I   | 90  | 95  | Y | Y |
| 6  | 0 | 0 | 1 | 0 | 1 | I   | 95  | 90  | 95  | Y | Y |
| 7  | 0 | 0 | 1 | 1 | 0 | 90  | I   | 90  | 95  | Y | Y |
| 8  | 0 | 0 | 1 | 1 | 1 | 90  | 95  | 90  | 95  | Y | Y |
| 9  | 1 | 1 | 0 | 0 | 0 | I   | I   | 90  | 95  | Y | Y |
| 10 | 0 | 1 | 0 | 0 | 1 | I   | 95  | 90  | 95  | Y | Y |
| 11 | 0 | 1 | 0 | 1 | 0 | 90  | I   | 90  | 95  | Y | Y |
| 12 | 0 | 1 | 0 | 1 | 1 | 90  | 95  | 90  | 95  | Y | Y |
| 13 | 0 | 1 | 1 | 0 | 0 | I   | I   | BUS | BUS | | |
| 14 | 0 | 1 | 1 | 0 | 1 | I   | BUS | BUS | BUS | | |
| 15 | 0 | 1 | 1 | 1 | 0 | BUS | I   | BUS | BUS | | |
| 16 | 0 | 1 | 1 | 1 | 1 | BUS | BUS | BUS | BUS | | |
| 17 | 1 | 0 | 0 | 0 | 0 | I   | I   | 90  | 95  | Y | Y |
| 18 | 1 | 0 | 0 | 0 | 1 | I   | 95  | 90  | 95  | Y | Y |
| 19 | 1 | 0 | 0 | 1 | 0 | 90  | I   | 90  | 95  | Y | Y |
| 20 | 1 | 0 | 0 | 1 | 1 | 90  | 95  | 90  | 95  | Y | Y |
| 21 | 1 | 0 | 1 | 0 | 0 | I   | I   | 90  | I   | | |
| 22 | 1 | 0 | 1 | 0 | 1 | I   | 95  | 90  | I   | | |
| 23 | 1 | 0 | 1 | 1 | 0 | 90  | I   | 90  | I   | | |
| 24 | 1 | 0 | 1 | 1 | 1 | 90  | 95  | 90  | I   | | |
| 25 | 1 | 1 | 0 | 0 | 0 | I   | I   | I   | 95  | | |
| 26 | 1 | 1 | 0 | 0 | 1 | I   | 95  | I   | 95  | | |
| 27 | 1 | 1 | 0 | 1 | 0 | 90  | I   | I   | 95  | | |
| 28 | 1 | 1 | 0 | 1 | 1 | 90  | 95  | I   | 95  | | |
| 29 | 1 | 1 | 0 | 0 | 0 | I   | I   | I   | I   | | |
| 30 | 1 | 1 | 1 | 0 | 1 | I   | BUS | I   | I   | | |
| 31 | 1 | 1 | 1 | 1 | 0 | BUS | I   | I   | I   | | |
| 32 | 1 | 1 | 1 | 1 | 1 | BUS | BUS | I   | I   | | |

I = INTERNAL POWER SOURCE
90 = BUS SEGMENT 90
95 = BUS SEGMENT 95
BUS = BUS
Y = YES

CONFIGURABLE POWER DISTRIBUTION CIRCUIT

RELATED APPLICATIONS

The subject patent application is related to U.S. patent application Ser. No. 08/954,334 titled "Circuit and Method for Power Distribution Management," filed Oct. 17, 1997, by Steven R. Bard, assigned to the assignee of the present invention, and herein incorporated by reference. The subject patent application also is related to U.S. patent application Ser. No. 09/939,125 titled "Configurable Power Distribution Circuit," filed Aug. 24, 2001, by Claude A. Cruz, assigned to the assignee of the present invention.

BACKGROUND

1. Field of the Invention

The present invention relates to a power distribution circuit and, more particularly, to a configurable power distribution circuit.

2. Background Information

In a variety of situations, it is desirable to have the ability to transfer power between different systems or devices. It might be desirable, for example, to have the capability for a notebook computer to provide operating power to an attached peripheral device, such as a camera or a scanner. Likewise, it might be desirable for a personal computer (PC) docking station to provide operating power to a notebook computer docked to that PC docking station, such as via a power bus or power distribution cable, for example.

This capability, however, introduces complexities related to configuring the power source/sink relationships between a set of devices or systems. Of course, in this context, power source/sink relationships includes relationships in which power is neither sourced nor sinked, such as in a "pass through" relationship, as explained in more detail herein. (Likewise, the terms "source/sink" and "sink/source" are used interchangeably.) It would be desirable if a circuit or technique were available to address these power distribution complexities.

SUMMARY

Briefly, in accordance with one embodiment of the invention, a circuit includes: a physical arrangement of power transistors. The circuit is adapted to couple a node to a power bus segment. The physical arrangement of power transistors is electronically configurable, based on externally derived electrical signals, to sink power to the node from the bus segment, source power from the node to the bus segment, and distribute power through the node.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings, in which:

DETAILED DESCRIPTION

In the following detailed description, specific details are set forth in order to provide a thorough understanding of the invention. However, it will be understood by those skilled in the relevant art that the present invention may be practiced without these specific details. In other instances, well-known methods, procedures, components, and circuits have not been described in detail so as not to obscure the present invention.

Figure 1:
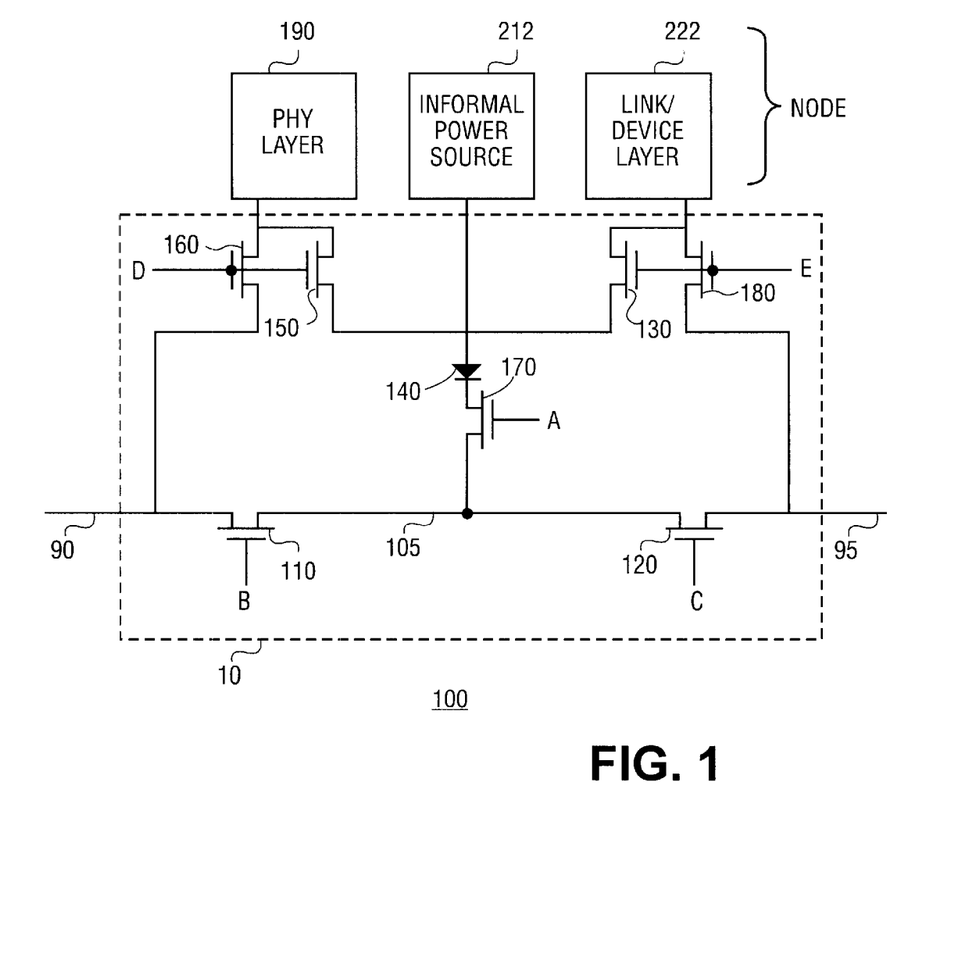
FIG. 1 is a circuit diagram illustrating an embodiment of a configurable power distribution circuit in accordance with the invention.

FIG. 1 is a circuit diagram illustrating an embodiment 100 of a configurable power distribution circuit in accordance with the present invention. Of course, many embodiments are possible and the invention is not limited in scope to the one illustrated. For example, although the invention is not limited scope in this respect, embodiment 100 is illustrated as embodied on an integrated circuit (IC) chip. As illustrated in FIG. 1, embodiment 100 comprises a physical arrangement of power transistors, such as 160, 150, 130, 170, 180, 120, and 110. The integrated circuit is adapted to couple a node to a power bus or power bus segment, such as a power distribution bus or cable, here comprising power bus segments 90, 105, and 95. Bus segment 105 comprises a "pass-through" segment and is internal to the node in this embodiment. In this context, a power bus or power distribution cable includes a collection of power bus segments that are coupled via intervening electrical circuitry. Likewise, in this context, a power bus segment refers to an electrical connection or coupling for transferring power between or via electrically isolated sink, source or pass-through nodes. As illustrated in FIG. 1, the node in this embodiment comprises at least a physical layer 190 and a link layer 222, although the invention is not limited in scope in this respect. In this context, the term node refers to a bus or bus segment interface plus one or more coupled devices. As will be explained in more detail hereinafter, the physical arrangement of power transistors is electronically configurable, based on externally derived electronic or electrical signals, to sink power to the node from a bus segment or segments, source power from the node to a bus segment or segments, and distribute power through the node, such as across a power bus segment or segments, to another node or nodes. Furthermore, as will be explained in more detail, the physical arrangement of power transistors are also electronically configurable so that the power bus segments comprising the power bus may be electrically isolated to form "power domains", as explained in more detail hereinafter.

The IEEE 1394 specification, "IEEE Standard for a High Performance Serial Bus", IEEE Std 1394–1995, Aug. 30, 1996, available from Institute of Electrical and Electronics Engineers, Inc. (IEEE), 345 East 47$^{th}$ Street, New York, N.Y. 10017, (hereinafter 1394 specification), describes a high speed serial bus that includes the capability for sourcing power from one "node" to another over a power bus coupling the nodes. As previously indicated, this power sourcing capability might be used, for example, to allow a notebook computer to provide operating power to an attached peripheral device, such as a camera or a scanner, although the invention is not limited in scope to this example. It might also enable a PC docking station to provide operating power, via a 1394 specification compliant cable or bus, for example, to a docked notebook computer. However, as previously indicated, this power sourcing capability introduces potential complexities into the process of configuring the power source/sink relationships between a set of devices or systems, such as those coupled by a 1394 specification compliant bus. For example, at any given time, one device should be providing or sourcing power and the remaining devices should either consume power as a power sink, power themselves, or act as a power "conduit" distributing power from the power source to devices coupled to the power distribution bus or cable (but not directly coupled to the power source).

This situation is made more complex because a 1394 specification compliant device or system may operate in any one of several states ranging from full functionality to a powered-down state with limited functionality. Depending on the particular situation, this may result in a 1394 specification compliant bus being effectively separated into disjoint power bus segments (e.g., the bus may become "fragmented"). In this context, the term disjoint refers to power bus segments that are electrically isolated from each other. This may result in problems for bus or cable powered devices or systems located downstream relative to the bus or cable power source. In other words, the power provided by the power source might not be transferred to the bus segment that is disjoint from the bus segment directly coupled to the power source, thus rendering devices on such disjoint segments non-functional.

Using the 1394 specification as one example only, a 1394 specification compliant interface has a tiered structure including three layers: the PHY, link and transaction layers. In one embodiment, the physical-interface layer, or PHY, may provide an electrical interface to a 1394 specification compliant cable. The PHY includes primarily analog circuitry, including per-port functions, such as bus-port receivers, transmitters and signal-level comparators, and functions which may be shared across ports, such as bit-stream encoders, decoders, synchronization circuits and clock-generation circuits (phase-locked loops). The link layer may provide packetizing services, and may intervene between the PHY and the higher-level transaction layer. The link layer may comprise digital circuitry to perform data serialization and deserialization, data framing and checking, isochronous (e.g., guaranteed-bandwidth) cycle control, and, perhaps, packet buffering, for example. The transaction layer may comprise a digital hardware and software structure which may provide three types of packet-based transactions: read, write and lock (to allow atomic, or indivisible, transaction sequences). For a 1394 specification compliant node, all higher-level 1394 protocols make use of the transaction layer. Two low-power operating modes are being proposed for inclusion in a new IEEE specification or standard, being referred to informally as "the 1394a specification" and available in draft form, such as currently, draft 0.9, from IEEE. A "standby" mode allows an interface to continue to propagate bus traffic, while a device attached to the bus through that interface is in a "sleep" state. The "suspend" state or mode saves substantially more power, at the cost of not permitting the bus to process packet traffic. Rather, in the suspend state or mode, nodes coupled to the bus are only able to generate or receive "wake-up" events, such as changes in node battery state, occurrence of a telephony "ring-indicate" signal, etc. In a normal operating state, a 1394 specification compliant node's PHY and link layer are both powered on. This is not the case in low-power states. In standby, for example, the PHY is powered, but only portions of the link layer are on or operating. In suspend, the link layer is off or not operating, and the PHY is receiving low-current "trickle" power. In addition to varying the current and voltage levels for a node's PHY and link layers, the latter may draw power from either of two sources: either from a 1394 specification compliant cable, or from a power source located within the node. A link layer's or PHY's power source may change over time, such as when a battery-powered node switches to a just acquired alternating current (AC) power source. Therefore, having the capability to make this selection would be a desirable feature. Of course, the 1394 specification is provided only as an example and the invention is not restricted in scope to use with buses or nodes that only comply with the 1394 specification.

Figure 2:
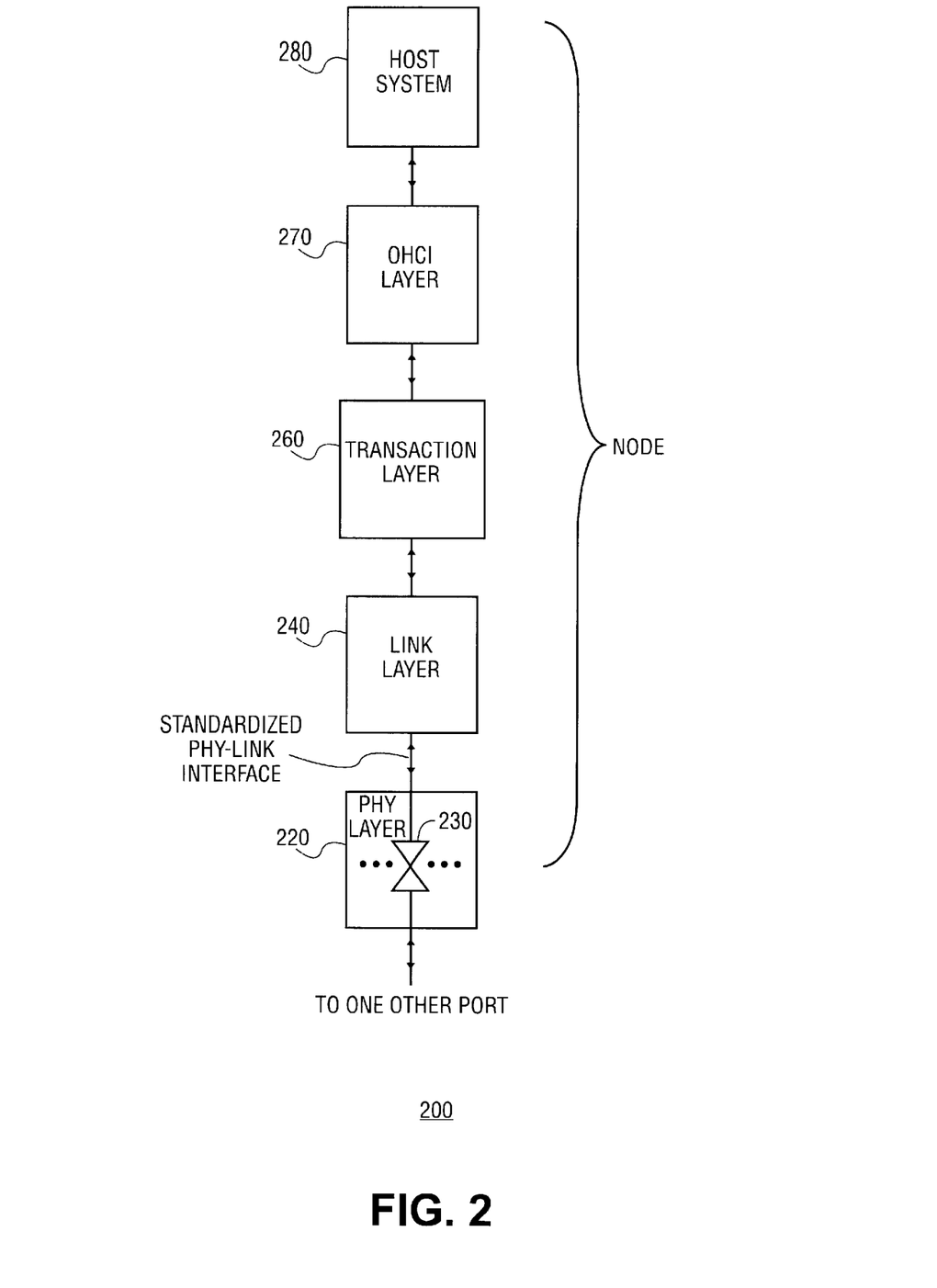
FIG. 2 is a block diagram illustrating an embodiment of a node complying with the IEEE 1394 specification that may employ an embodiment of a configurable power distribution circuit in accordance with the invention.

FIG. 2 is a schematic diagram illustrating an embodiment of a node coupled to a signal bus compliant with the 1394 specification. Of course, again, the invention is not restricted in scope to use in this particular embodiment. Thus, again, the invention is not restricted in scope to use in connection with a 1394 specification compliant bus. In this particular embodiment, however, a 1394 specification compliant node includes at least a physical layer (PHY) and a link layer, as previously indicated. A physical layer is directly coupled to a bus signal path, such as bus signal path 210 illustrated in FIG. 2. As illustrated in FIG. 2, physical layer 220 has one port. FIG. 2 illustrates analog transceiver 230 coupled to bus signal path 210 via this port. In a 1394 specification compliant bus, each port is coupled to one other port, resulting in a point-to-point structure; however, packets are routed to all active nodes providing the ability for a node to communicate with any other node. Physical layer 220 includes typical operations, such as clock generation and signal encoding and decoding. Therefore, the analog signals received via a signal path 210 are decoded into digital signals to be provided to link layer 240. Likewise, binary digital signals or bits provided in a bit stream via link layer 240 to physical layer 220 are encoded by physical layer 220 for transmission via bus signal path 210. As indicated, the link layer performs packet processing typically, such as bit serialization, bit deserialization, addressing, packet assembly, and packet disassembly. Likewise, transaction layer 260 performs operations, such as reading, writing and atomic, or indivisible, read-modify-write cycles, as described. In this particular embodiment, 270 comprises an Open Host Controller Interface (OHCI) specification compliant device which is coupled to a host computer system 280, such as a personal computer (PC), although the invention is not limited in scope in this respect.

Physical layer 220, in FIG. 2, does not handle the node's power requirements in this embodiment; however, an embodiment of the invention might be used in an environment where it includes power switching circuits or input-output ports to support external power switching signals. In this embodiment, however, a power distribution network is separate from, but operates in parallel with, the signal paths. In this context, a power distribution network refers to the network coupling a self-contained or independent set of power source/sink relationships between a plurality of nodes coupled via a collection of power cable or power bus segments, referred to here as a power cable or power bus. The power distribution network may either accept power into the node or from the bus, it may feed power from the node onto the bus, it may pass or distribute bus power through the node, enabling other nodes or it may fragment the power network into independent "power domains" at the node. However, as previously described a 1394 specification compliant node may be in any one of several operational or power states. The node's power state affects the operation of the device's physical layer, which provides an electrical interface for transferring data and control, and its link layer, which provides packet processing operations. A node's PHY and link layer may have different and independent power requirements in different power states. In addition, it may be desirable to reconfigure a node's power bus based at least in part on the node's state since the signal path capabilities of the node may be employed for management of the power bus. Without this, for example, the power network of a 1394 specification compliant power bus may effectively be divided into two disjoint or electrically isolated bus segments, which may result in problems for bus or cable-powered devices or systems located downstream of the interrupting node relative to the present power source.

In another undesirable situation, a node coupling a power source to a power consumer or sink may be in a low power or "disabled" state. The power source will be unable to communicate with the power consumer that is using or possibly even exhausting supplied power. Likewise, power utilization by the power consumer "behind" the disabled node (with respect to the power source) may increase, resulting in a drain of even more power potentially. Thus, scenarios exist in which the power utilized may become effectively unmanageable.

The embodiment illustrated in FIG. 1 comprises a mechanism or technique for performing configurable or reconfigurable power distribution, such as over a 1394 specification compliant bus, although the invention is not limited in scope to buses complying with the 1394 specification. This embodiment includes the capability to independently select the power sources for a 1394 specification compliant node's physical and link layers, by drawing from an internal power source or a power source available via the power bus. Likewise, it includes the ability for the 1394 compliant power bus to be partitioned at the node, resulting in two independently manageable, electrically isolated, power bus segments or "power domains" on either side of the node. Therefore, each resultant "bus segment" may include its own set of distinct or particular power source/sink relationships. Likewise, this particular embodiment includes the capability for a node to selectively supply power to either or both of these two power bus segments or to the power bus as a whole, forming a single power domain from adjacent and electrically coupled power-bus segments.

In FIG. 1, physical layer 190 and link layer 222 are illustrated at the top of the figure along with an optional node internal power source 212 which may be employed to supply power to the power bus or to the node's PHY and/or link layer. Likewise, although the invention is not limited in scope in this respect, the configurable power distribution circuit is illustrated as embodied on a separate integrated circuit. Physical layer 190 may be configured to draw power either from the node's internal power source 212 or from the power bus, more specifically from bus segment 90, but observe that segment 90 may also be electrically linked to power bus segments 105 and 95 through power transistors, such as power field effect transistors (FETs) 110 and 120. Thus, PHY 190 may draw power from bus segments 90 or 95, for example. This may be accomplished in this embodiment by setting the control signal of a physical layer selector switch, such as D, to a "one" or to a "zero" to select power from segment 90 or internal power, respectively, assuming, for example, that 160 and 180 comprise N-channel FETs and 130 and 150 comprise P-channel FETs. In this embodiment, the physical layer selector switch is implemented as a pair of power transistors and voltage signals having a voltage signal level indicating a logical "one" or "zero" are applied to the transistors' gates. Of course, power bipolar transistors might alternatively be employed. Likewise, the control signal for transistors 130 and 180 select the power source for the link layer/device in a similar manner.

As illustrated, two field effect transistors (FETs) 110 and 120 are interspersed serially in the power bus. Control signals may be applied to these FETs so that bus segments 90 and 95 of the power bus couple to or electrically isolate from one another. In addition, in this embodiment, FET 170 is employed to enable or disable current flow from the node's internal power supply 212 to internal bus segment 105. In this particular embodiment, a sufficient voltage applied to the gate of transistor 110 enables current flow across the associated FET and, likewise, for transistor 120, from the node's internal power supply to the power bus. Likewise, in this embodiment, a diode 140 is included in the current flow path. In this embodiment, this protective diode is employed to ensure that power does not flow into the node's internal power source in the event that a higher voltage power source is coupled to the power bus.

Figure 4:
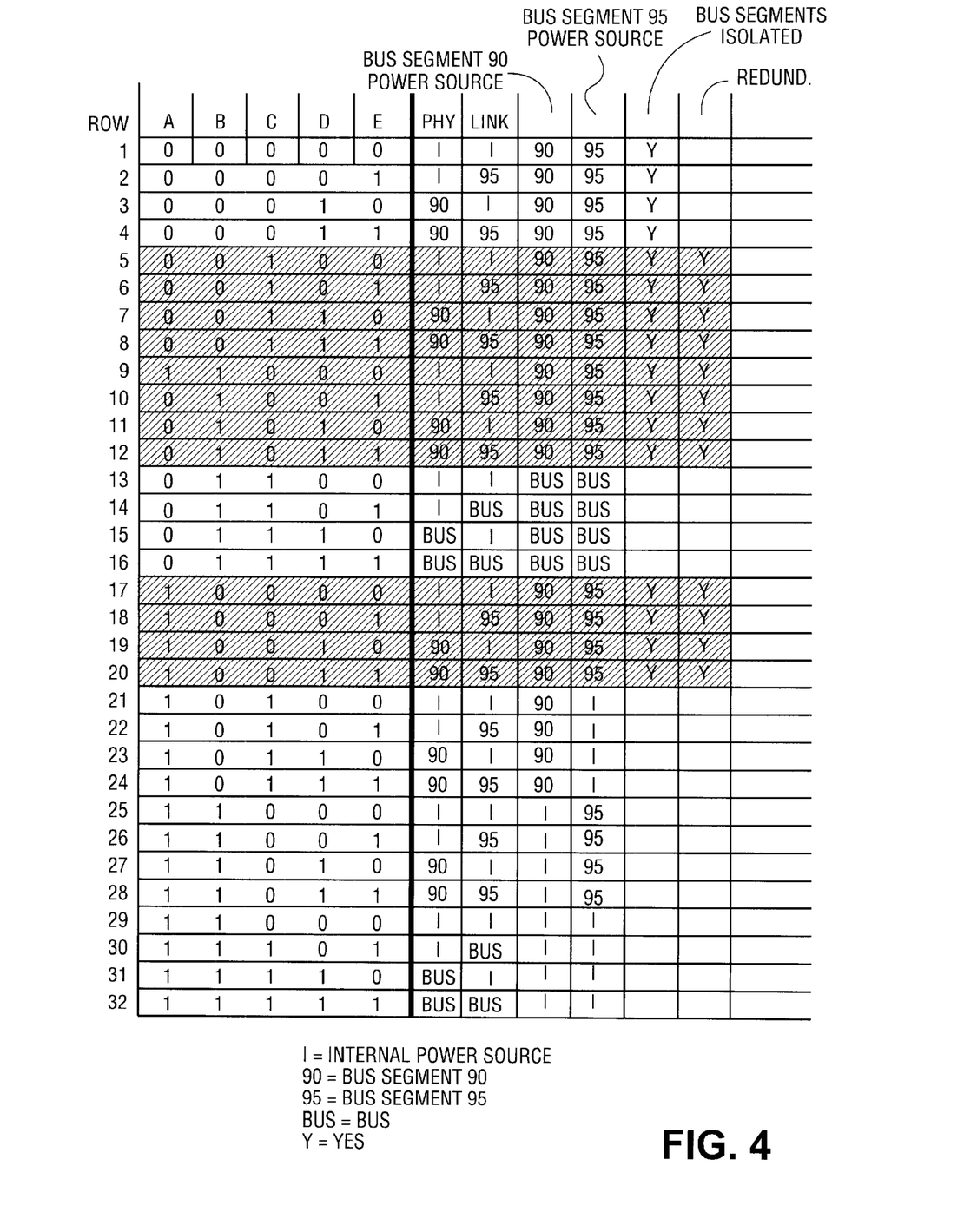
FIG. 4 is a table of possible configurations for the embodiment of FIG. 1.

FIG. 4 is a table describing the operation of this particular embodiment. The left portion of the table provides the possible combinations of the five control signals that may be applied to this particular embodiment. The right portion of the table provides the physical layer and link layer power source selections resulting from the associated control signal states as well as the relationship of the bus segments. It should be noted that the table includes some redundancy in that different applied control signals provide the same results with respect to power source selections. Therefore, the redundant rows may be eliminated without a loss of capability in this particular embodiment. This is illustrated in FIG. 4 by shading for the redundant rows. For example, table rows 5, 9, and 17 implement the same switching mechanism as that of row 1, and, thus, may be eliminated.

Based on the previous description, a situation might occur in which a first node's internal power source is enabled to supply power to the cable, and the first node's physical layer and link layer are configured to draw power from the cable, yet the first node's physical and link layers do not obtain power from the first node's internal supply. For example, a higher voltage source of a second node may also be coupled to the power bus. The second node may actually supply the bus power including that drawn by the first node's physical layer and link layer. In this situation, the first node's protective diode prevents power from flowing into the first node's internal supply.

Of course, the invention is not limited in scope to this particular embodiment or to an embodiment that includes all of the operational functionality previously described. Depending upon the situation, it may be desirable to employ a node with less than full functionality. For example, again, using the 1394 specification as an example, the physical layer and link layer may be designed or constructed to only obtain power from the power bus, and, therefore, an internal supply may not be needed. Likewise, depending upon the situation, it may not be desirable to employ power transistors (e.g., 110 and 120 in FIG. 1) to provide separate power domains. The advantages of these embodiments in which less than full functionality is employed includes saving the cost of power transistors and associated control logic.

Likewise, it may not be desirable for every node to include the functionality previously described. It may depend, for example, on the particular devices or systems coupled to the power bus. For example, some nodes may comprise "smart" devices or systems, while some may comprise "dumb" devices or systems. For example, the power bus may be employed to couple a camera to a PC. Typically, a camera may not be utilized as a cable power source, and therefore, the expense of a configurable power distribution circuit may not be justified. Alternatively, of course, a PC may typically include a variety of operational states and including an embodiment of a configurable power distribution circuit in accordance with the invention for a PC node may be desirable.

This particular embodiment is adequate to provide support for software control of all power configuration needs for a power bus complying with the 1394 specification. This configuration capability is particularly advantageous in mobile platform implementations of the 1394 specification, so that a notebook computer may switch between internal battery power, an alternating current (AC) power "brick", or cable power. Devices may couple to or decouple from the power bus at any time where this particular embodiment or alternative embodiments are employed. Likewise, a mix of bus-powered and self-powered devices may be coupled to the power bus.

Figure 3:
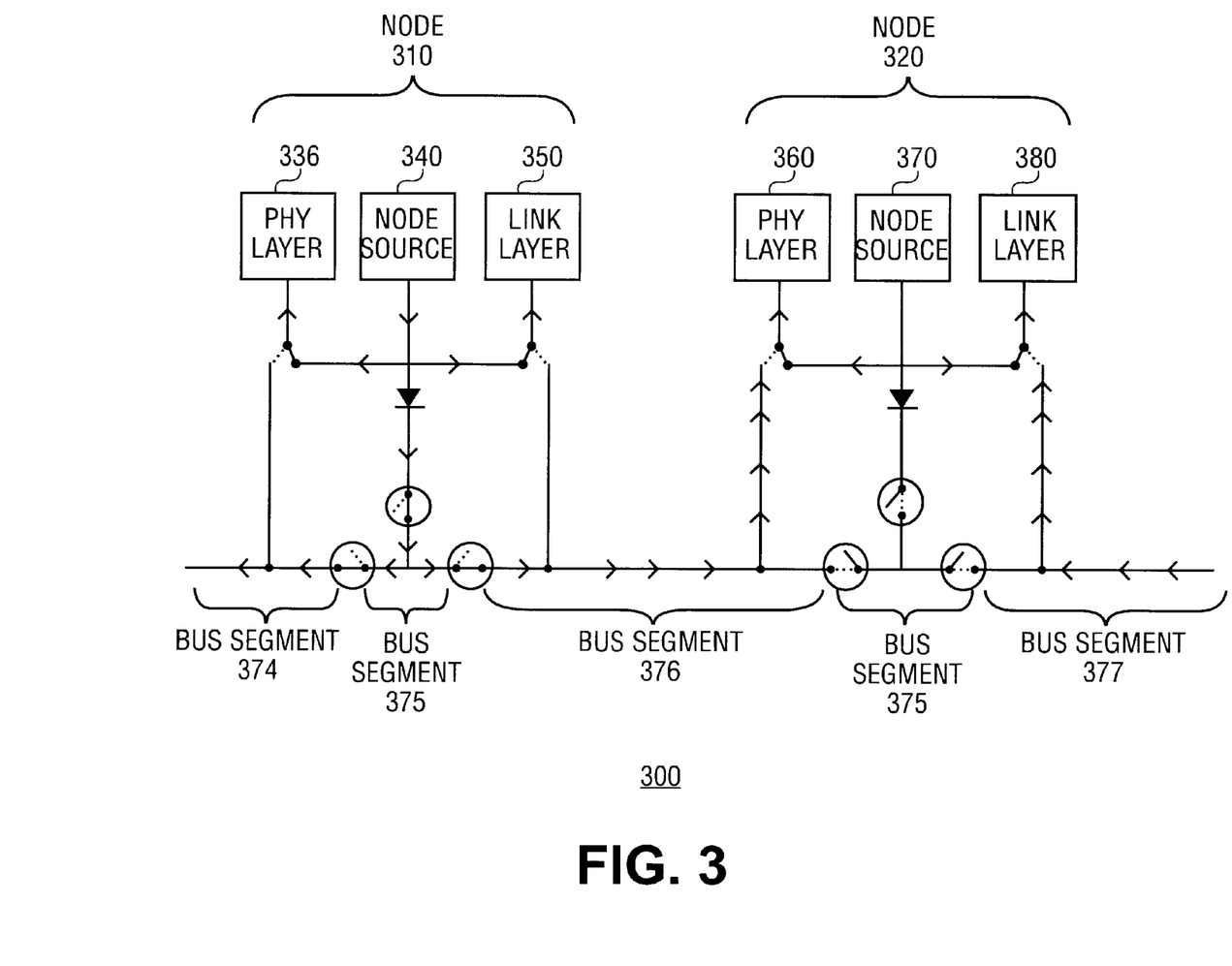
FIG. 3 is a schematic diagram illustrating an embodiment of a network employing an embodiment of a configurable power distribution circuit in accordance with the invention.

FIG. 3 is a block diagram illustrating an embodiment of two nodes of a network employing the embodiment of FIG. 1. This particular embodiment illustrates two nodes coupled to a power bus that is divided or electrically isolated into three power bus segments. As illustrated in FIG. 3, node 310 includes physical layer 330 which is powered by node internal power source 340. Likewise, link layer 350 for node 310 is powered by internal power source 340. Internal power node source 340 is also providing power to bus power segments 374 and 376. In contrast, physical layer 360 for node 320 is powered from power bus segment 376 (and, therefore, from node 310's internal power source under the prescribed switch settings). Link layer 380 of node 320 is powered from segment 377. Furthermore, the node internal power source of node 320 is inactive or not providing power and power bus segment 376 is electrically isolated from segment 377. Segment 375 is configured to be electrically isolated from the power bus.

Although the previous embodiments have been described in connection with the 1394 specification, any cable power distribution system may make use of an embodiment of the invention. For example, an embodiment of the invention may be employed in connection with the Universal Serial Bus (USB) specification, available from the Universal Serial Bus-Implementers Forum, 2111 N.E. 25th Ave., MS JF2-51, Hillsboro, Oreg. 97124. Likewise, one embodiment of the invention may be employed for use with a variety of different serial bus powering systems, including those compliant with different specifications, such as USB or 1394. Furthermore, this power distribution scheme may also be used with parallel buses. As the previous embodiments and discussion illustrates, an embodiment of a configurable power distribution circuit in accordance with the invention provides a power distribution capability and this capability is independent of the parallel or serial signaling nature of the bus.

Figure 5:
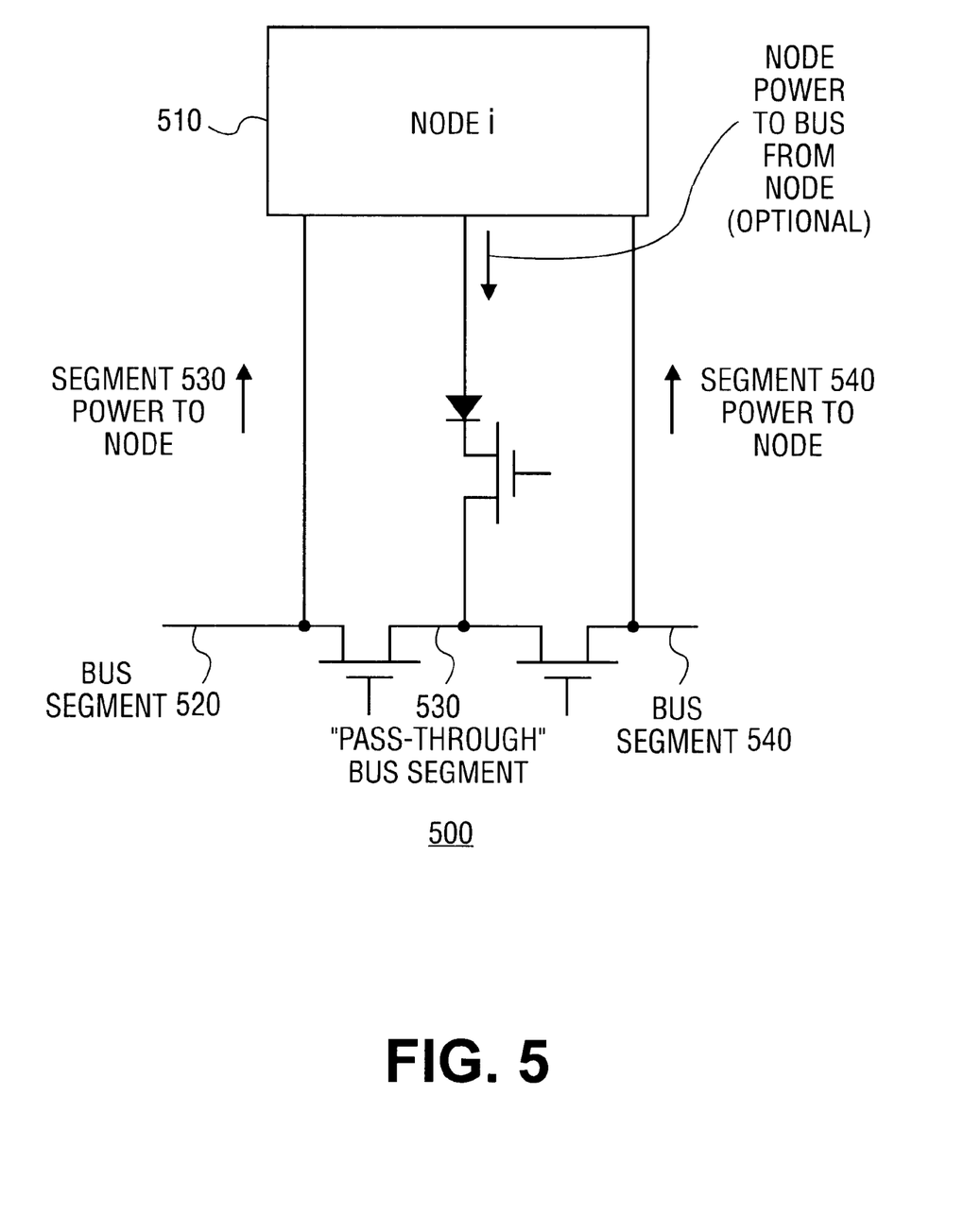
FIG. 5 is a circuit diagram illustrating an embodiment of a configurable power distribution circuit in accordance with the invention coupled to a generalized node.
Figure 6:
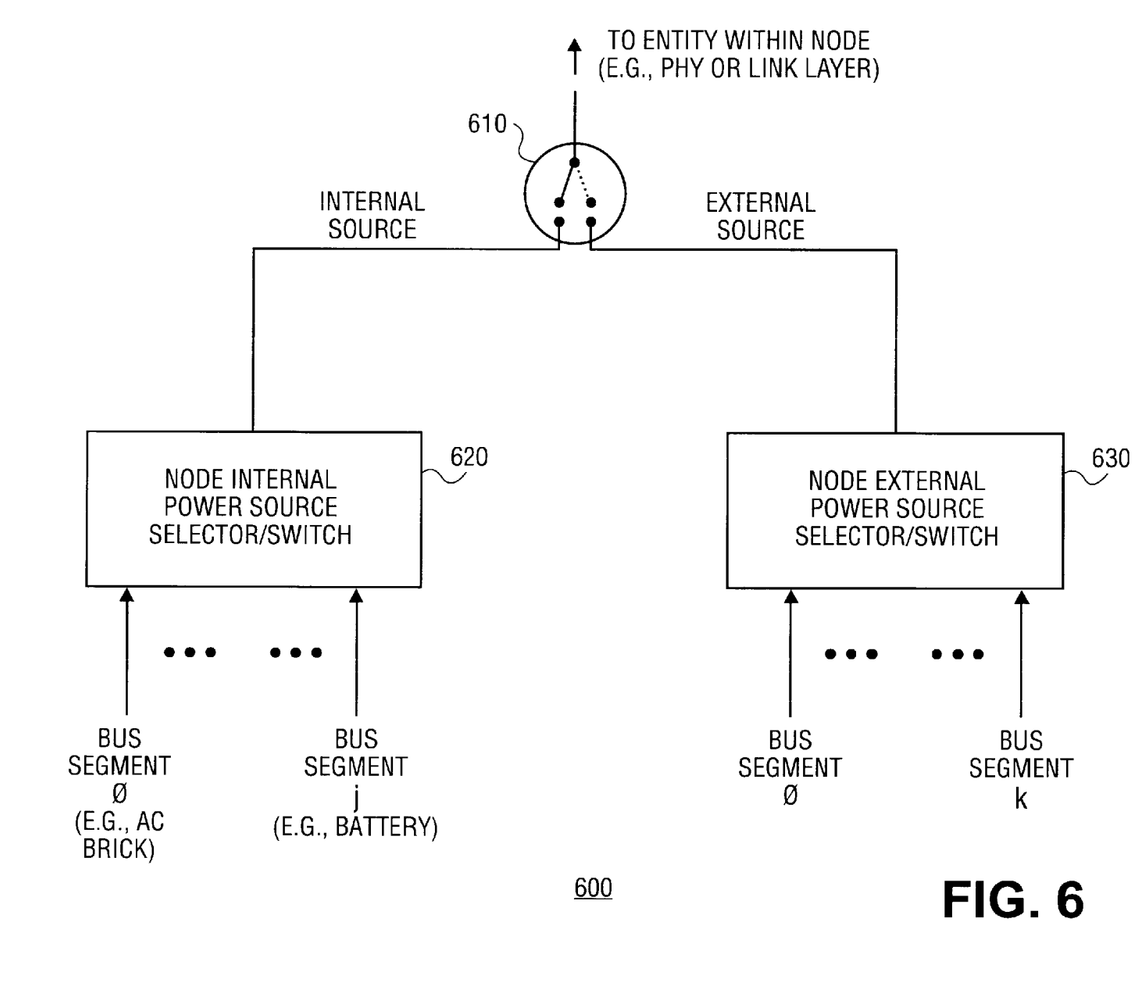
FIG. 6 is a schematic diagram illustrating power source selection and associated relationships for a node.

FIG. 5 is a circuit diagram illustrating an embodiment 500 of a configurable power distribution circuit in accordance with the invention coupled to a generalized node 510. The diagram also indicates the flow of power and the electrical coupling relationships, such as between bus segments 520, 530, and 540. FIG. 6 alternatively is a schematic diagram depicting in a conceptual fashion the power source selection and associated relationships for a particular node. As illustrated, a particular node may select either an internal source for power or external source for power, depicted by power source selection 610. Likewise, either of these power sources may be obtained via a power source selection made between a variety of bus segments for the selection of an external source, as for 630, or made between a variety of internal power sources for the selection of an internal source, as for 620.

An embodiment of a configurable power distribution circuit in accordance with the invention, such as previously described, may be employed to implement an embodiment of a method for distributing power in accordance with the invention as follows. In this embodiment, power is distributed among a plurality of nodes. Portions of the power bus may be electrically isolated into power bus segments, such as at least two segments, such as by using an embodiment previously described, for example. Of course, more than two power bus segments may also be employed. Then, particular sets of power sink/source relationships among the nodes may be configured. In this embodiment, the particular nodes may be coupled to the respective power bus segments previously described, for example. Although the invention is not limited in scope to being employed in connection with the 1394 specification or a 1394 specification compliant bus or node, where a 1394 specification compliant bus or node is employed, each node comprises at least a physical layer and a link layer, as previously described. Furthermore, as previously described and illustrated, in embodiments of a configurable power distribution circuit in accordance with the present invention, the particular sets of power sink/source relationships among the nodes includes relationships that vary over time or are "time varying". In this particular embodiment, a particular set of power sink/source relationships among the nodes are configured by applying externally derived electrical signals to an electrically configurable physical arrangement of power transistors, such as previously described. The externally derived electrical signals may, for example, be provided by a personal computer operating in accordance with software loaded on the computer that provides the desired electrical signals to configure the physical arrangement of power transistors as desired. Of course, the invention is not limited in scope in this respect.

In another embodiment of a method of distributing power in accordance with the present invention, a plurality of nodes coupled via a plurality of power bus segments may be configured to provide at least one particular set of power sink/source relationships among the coupled nodes. Therefore, in this embodiment, there may be one particular set of power sink/source relationships. Likewise, there may also be another particular set of power sink/source relationships other than this one particular set of power sink/source relationships. For example, the two sets of particular source/sink relationships may be electrically isolated and form isolated power bus segments, such as previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A circuit comprising:

a physical arrangement of power transistors;

said circuit being adapted to couple a node to a power bus segment;

said physical arrangement of power transistors being electronically configurable, based on externally derived electrical signals, to sink power to the node from the power bus segment, source power from the node to the power bus segment, and distribute power through the node;

wherein said arrangement of transistors is also electronically configurable so that at least two power bus segments are capable of being coupled to the node and electronically isolated from each other at the node.

2. The circuit of claim 1, wherein said transistors comprise power field effect transistors (FETs).

3. The circuit of claim 1, wherein said circuit is coupled to a bus for transferring signals compliant with the 1394 specification.

4. The circuit of claim 1, wherein said node comprises at least a physical layer and a link layer.

5. The circuit of claim 1, wherein said physical arrangement of power transistors is embodied on an integrated circuit (IC) chip.

6. A circuit comprising:

a physical arrangement of power transistors;

said circuit being adapted to couple a node to a power bus segment;

said physical arrangement of power transistors being electronically configurable, based on externally derived electrical signals, to sink power to the node from the power bus segment, source power from the node to the power bus segment, and distribute power through the node;

wherein the power bus segment comprises a power bus segment via which nodes with a particular set of power sink/source relationships may be coupled, and said particular set of power sink/source relationships is time-varying.

7. A method for distributing power among a plurality of nodes via a power bus, comprising:

electronically isolating portions of the power bus into at least two power bus segments; and configuring particular sets of power sink/source relationships among the nodes coupled to the respective power bus segments of said at least two power bus segments;

wherein the configuring of particular sets of power sink/source relationships among the nodes comprises configuring time-varying power sink/source relationships among the nodes.

8. The method of claim 7, wherein said nodes each comprise at least a physical layer and a link layer.

9. The method of claim 7, wherein the nodes are also coupled by a bus comprising a bus for transferring signals compliant with the 1394 specification.

10. The method of claim 7, wherein configuring particular sets of power sink/source relationships among the nodes comprises applying externally derived electrical signals to an electrically configurable physical arrangement of power transistors.

11. A method for distributing power among a plurality of nodes via a power bus coupling a plurality of nodes together, comprising:

configuring at least one particular set of power sink/source relationships among the nodes coupled via the power bus;

wherein the configuring at least one particular set of power sink/source relationships comprises configuring another particular set of power source/sink relationships other than the at least one particular set of power source/sink relationships, and the at least one particular set of power source/sink relationships and the another particular set of power source/sink relationships are electrically isolated and form two power bus segments.

* * * * *